United States Patent
Janjic et al.

(10) Patent No.: US 11,462,953 B2
(45) Date of Patent: Oct. 4, 2022

(54) DYNAMIC TRANSMISSION COIL POSITIONING SYSTEM, WIRELESS POWER TRANSFER SYSTEM AND METHOD OF POSITIONING A TRANSMIT COIL

(71) Applicant: TDK Electronics AG, Munich (DE)

(72) Inventors: Nikola Janjic, Solothurn (CH); Stefan Zbinden, Lommiswil (CH); Hugh Hemphill, Solothurn (CH)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 16/763,465

(22) PCT Filed: Nov. 13, 2017

(86) PCT No.: PCT/EP2017/079039
§ 371 (c)(1),
(2) Date: May 12, 2020

(87) PCT Pub. No.: WO2019/091580
PCT Pub. Date: May 16, 2019

(65) Prior Publication Data
US 2020/0366138 A1      Nov. 19, 2020

(51) Int. Cl.
*H02J 50/90* (2016.01)
*H02J 50/12* (2016.01)
*H01F 38/14* (2006.01)
*B60L 53/38* (2019.01)

(52) U.S. Cl.
CPC .............. *H02J 50/90* (2016.02); *H01F 38/14* (2013.01); *H02J 50/12* (2016.02); *B60L 53/38* (2019.02)

(58) Field of Classification Search
CPC ........... H02J 50/90; H02J 50/12; H01F 38/14; B60L 53/38; Y02T 90/12; Y02T 90/14; Y02T 10/7072; Y02T 10/70
See application file for complete search history.

(56) References Cited

U.S. PATENT DOCUMENTS

| | | | |
|---|---|---|---|
| 8,305,036 B2 * | 11/2012 | Toya | H02J 50/60 320/108 |
| 9,333,870 B2 * | 5/2016 | Kume | B60L 53/38 |
| 9,490,064 B2 * | 11/2016 | Hirosawa | H02J 7/00712 |
| 10,056,782 B1 * | 8/2018 | Leabman | G05F 1/67 |
| 2006/0022787 A1 * | 2/2006 | Brennan | H01F 41/046 336/200 |

(Continued)

FOREIGN PATENT DOCUMENTS

| | | | | |
|---|---|---|---|---|
| EP | 2 043 226 A2 | 4/2009 | | |
| EP | 2043226 A2 * | 4/2009 | | H02J 50/70 |

(Continued)

OTHER PUBLICATIONS

Merriam-Webster, "Definition of Horizontal" pp. 1-5 (Year: NA).*

(Continued)

*Primary Examiner* — Pinping Sun
(74) *Attorney, Agent, or Firm* — Nixon Peabody LLP

(57) ABSTRACT

A dynamic transmit coil positioning system, e.g. for a wireless power transfer system. The positioning system has a drive unit, a movable platform, a transmit coil, an inverter and a controller. The controller is provided for positioning the movable platform via the drive unit to adjust an operating parameter of the transmit coil.

11 Claims, 4 Drawing Sheets

(56) References Cited

U.S. PATENT DOCUMENTS

| | | | |
|---|---|---|---|
| 2009/0079387 A1 | 3/2009 | Jin | |
| 2011/0291489 A1* | 12/2011 | Tsai | H02J 50/402 307/104 |
| 2012/0153894 A1* | 6/2012 | Widmer | H02J 50/60 320/108 |
| 2012/0161542 A1* | 6/2012 | Kim | H02J 50/12 307/104 |
| 2012/0223594 A1* | 9/2012 | Gotani | H02J 50/50 307/104 |
| 2013/0119925 A1* | 5/2013 | Kawamura | H02J 50/90 320/108 |
| 2013/0249477 A1 | 9/2013 | Beaver | |
| 2014/0111022 A1 | 4/2014 | Yamakawa | |
| 2014/0125142 A1* | 5/2014 | Kanno | H02J 50/12 307/104 |
| 2014/0217966 A1 | 8/2014 | Schneider | |
| 2015/0318709 A1* | 11/2015 | Joi | H02J 50/80 307/104 |
| 2015/0340880 A1* | 11/2015 | Kdoshim | H02J 50/10 307/104 |
| 2016/0221459 A1* | 8/2016 | Jung | H02J 7/025 |
| 2016/0241061 A1* | 8/2016 | Werner | H02J 50/12 |
| 2016/0347193 A1* | 12/2016 | Caldwell | B60L 53/38 |
| 2017/0136907 A1* | 5/2017 | Ricci | H02J 5/005 |
| 2018/0159371 A1* | 6/2018 | Kim | H02J 50/10 |

FOREIGN PATENT DOCUMENTS

| | | |
|---|---|---|
| JP | H09-215211 A | 8/1997 |
| JP | 2009-081943 A | 4/2009 |
| JP | 2009-189087 A | 8/2009 |
| JP | 2010-252497 A | 11/2010 |
| JP | 2013-017254 A | 1/2013 |
| JP | 2013-115936 A | 6/2013 |
| JP | 2015-518648 A | 7/2015 |
| JP | 2017-005790 A | 4/2017 |
| WO | 2014068989 A1 | 5/2014 |

OTHER PUBLICATIONS

International Search Report and Written Opinion in International Application No. PCT/EP2017/079039, dated May 16, 2019 (10 pages).

* cited by examiner

DYNAMIC TRANSMISSION COIL POSITIONING SYSTEM, WIRELESS POWER TRANSFER SYSTEM AND METHOD OF POSITIONING A TRANSMIT COIL

CROSS-REFERENCE TO RELATED APPLICATIONS

This application is a U.S. National Stage of International Application No. PCT/EP2017/079039, filed Nov. 13, 2017, which is incorporated herein by reference in its entirety.

The present invention refers to the field of wireless power transfer, in particular to a positioning system for a transmit coil of a power transmission system.

Electrical power can be transferred from a transmitter to a receiver wirelessly. To that end the transmitter has a transmit coil and the receiver has a receive coil. The transmit coil emits power in the form of magnetic fields. The receive coil converts the magnetic power into electric power. Such a system can be used to supply power to a plurality of different devices ranging, e.g., from a smartwatch to the battery of an electrical vehicle.

However, in a wireless power transfer system a plurality of different parameters affect the operation of the system. In particular, the magnetic environment of the system affects parameters such as the operating frequency, voltages, currents and the power transfer rate. Further, standards limit allowed values, e.g. operation frequencies, to determined intervals.

Another factor that affects the operation is the geometric orientation of the transmitter and the receiver with respect to each other. Specifically, in wireless applications perfect orientations may not be granted for every power transfer process.

Known power transfer systems propose variable impedances in impedance matching circuits and/or active circuitry on the receiver sides to compensate for misaligned systems. For example an alignment system for power transfer systems that brings the transmit coil in the vicinity of the movable receive coil is known from US 2014/0217966 A1.

However, it was found that power transfer systems may show unwanted effects even if the above-mentioned technical solutions are used.

Thus, what is wanted is an improved possibility for transferring power even under unfavorable conditions.

To that end a dynamic transmit coil positioning system, a power transfer system and a method of positioning a transmit coil are provided. Dependent claims provide preferred embodiments.

The dynamic transmit coil positioning system comprises a drive unit and a movable platform. The movable platform is connected to the drive unit. Further, the positioning system comprises a transmit coil that is mounted to the movable platform and that is provided for transferring electromagnetic power to a receive coil. Further, the positioning system comprises an inverter electrically connected to the transmit coil. Additionally, the system comprises a controller electrically connected to the inverter and to the drive unit. The controller is provided for positioning the movable platform via the drive unit to adjust an operating parameter of the transmit coil.

In the context of the present dynamic transmit coil positioning system the drive unit comprises the mechanical parts for moving the movable platform. The inverter may be provided for transmitting electrical power to the transmit coil and can provide an operation frequency in an allowed frequency range, e.g. around 85 kHz. Then, the transmit coil emits a varying magnetic field that has a frequency of the operation frequency of the positioning system. The magnetic power should be received by a receive coil to which the electric power should be provided.

The inverter may be powered by an external power source. The receive coil may be used to recharge a battery or to directly provide power to a power consuming electrical circuit.

The controller is provided to control the drive unit, in particular to control the position to which the drive unit brings the movable platform carrying the transmit coil. The controller obtains an operating parameter of the power transmission process and determines an optimal position for the movable platform, preferably relative to the receive coil.

It was found that the operating parameters, especially of the inverter, depend very strongly on operating parameters, in particular on operating parameters between the transmit coil of the power transfer system. By making the position of the transmit coil dynamically variable utilizing the drive unit, it is possible to vary the operating parameter such that components operate within safe areas and operating frequencies are within limits. The operating parameter may be increased or decreased, e.g. by moving the transmit coil via the movable platform until the power transfer process and its parameters are within defined limits.

In particular, it was found that there are operating parameters which cause the power transfer system not to work optimally if the value of the operating parameter has an optimal value per se. Thus, an optimization of the power transfer process can be obtained if the operating parameter is determined to have a non-perfect operating parameter value.

Thus, by detuning the operating parameter an improved power transfer process can be obtained, power transmission standards can be complied with and all parameters are limited within safe operation modes.

It is possible that the drive unit performs the displacement of the movable platform in one or more directions. The directions can be selected from a lateral direction and a vertical direction. The vertical direction denotes an up/down movement parallel to the Z axis. Lateral directions can be within a horizontal plane defined by the X axis and the Y axis of a coordinate system used to describe directions of movement of the movable platform.

It is possible that the operating parameter of the transmit coil is the magnetic coupling factor between the transmit coil and the receive coil.

The magnetic coupling factor is to be defined according to equation (1):

$$k = m\sqrt{\frac{L_1}{L_2}} \quad (1)$$

Here m is the mutual inductance of the coil pair. $L_1$ is the inductivity of the transmit coil and $L_2$ is the inductivity of the receive coil.

It was found that it is difficult to control the operating frequency, a duty cycle, a phase angle and an input voltage range of the inverter when the coupling factor between the transmit coil and the receive coil is too high or too low. Further, it was found that an improved coupling factor can be obtained by moving the transmit coil relative to the receive coil. Overall, it was found that an improved power transfer operation can be obtained if the coupling factor is tuned according to the behavior of the whole power transmission system even if this means that the coupling factor itself may be reduced to a substantially smaller value. In particular, a relatively small horizontal offset between the transmit coil and the receive coil is needed for certain conditions to ensure that the power factor representing voltage current lag time is in a safe condition.

It is possible that the preferred coupling factor has a value between 0.15 and 0.4.

It is preferred that the operation frequency of the power transmission system is between 81.38 kHz and 90 kHz.

A possible displacement of the movable platform can be in the range between −32 mm and +32 mm in the X direction and/or in the Y direction.

By adjusting the operation parameter to a value optimal for the whole system a relatively small transmit coil and the relatively small receive coil can be utilized and the size of the small transmit coil added to the additional area needed for the movement may still result in a smaller area consumption compared to conventional transmit coils.

It is possible that the total area required in the xy plane is around 2400 $cm^2$ while conventional transmit coils have an area consumption of around 4000 $cm^2$.

It is possible that the drive unit comprises an electrical, pneumatic or hydraulic drive system.

Then, the movable platform may be moved by an electric engine, pneumatic and/or hydraulic actors, respectively. The motors and/or actors may be electrically powered.

It is possible that the drive unit is provided for obtaining positioning instructions from the controller. The controller is electrically connected to the drive unit and to the inverter. Thus, an operation parameter of the inverter can be provided to the controller to allow the controller to determine an optimal position of the movable platform.

Correspondingly, it is possible that drive unit is provided for acting upon positioning instructions from the controller.

Correspondingly, it is possible that the controller is provided for determining a position based on one or more parameters selected from the current operating frequency, a current-voltage relationship, a current value and a voltage value.

Current and voltage values can be values of the driving current of the transmit coil or of the driving voltage of the transmit coil provided by the inverter.

It is possible that the dynamic transmit coil positioning system further comprises a metal base below the transmit coil. Further, the positioning system can have a ferromagnetic base plate arranged between the transmit coil and the metal base. Additionally, the dynamic transmit coil positioning system can have a dielectric layer between the ferromagnetic base plate and the transmit coil.

The metal base below the transmit coil consists of the conducting material such as copper, aluminum or a similar metal or an alloy comprising copper and/or aluminum.

It is preferred that the metal base comprises a non-ferrous metal.

The ferromagnetic base plate between the transmit coil and the metal base comprises a ferromagnetic material, e.g. a ferrite.

The dielectric layer between the ferromagnetic base plate and the transmit coil comprises an insulating material that establishes a layer of insulation between the coil and the ferromagnetic plate.

It is possible that the transmit coil is selected from a circular coil, a spiral coil, a multi-coil connection, a polarized coil and a non-polarized coil.

In a circular coil the wire of the coil is arranged at a parameter of a circle. In a spiral coil the wire of the coil has the shape of a spiral. Different positions of the coil have different distances to the center of the coil. A multi-coil connection comprises two or more coil elements that work together to establish an inductive system. A polarized coil comprises two or more coil elements arranged next to another where the coil segments are electrically connected such that electrical current flows either clockwise in both segments or counter clockwise in both segments at a specific time. A non-polarized coil is a coil system comprising two or more coil segments that are electrically connected in such a way that while electrical current flows clockwise in one segment, the current flows counter clockwise in the adjacent segment.

It is possible to use the dynamic transmit coil position system in a wireless power transfer system. The wireless power transfer system comprises the dynamic transmit coil positioning system in a transmit system. Further, the wireless power transfer system comprises a receive system having a receive coil provided for receiving power from the transmit coil.

It is possible that the transmit coil and the receive coil have substantially the same size.

A method of positioning a transmit coil of the wireless power transfer system comprises the steps of
  determining an operation parameter,
  positioning the transmit coil relative to the receive coil according to the parameter.

Here, the wireless power transfer system comprises the transmit coil and the receive coil. It is possible that the wireless power transfer system further comprises matching networks, e.g. matching networks associated with the transmit and/or the receive coil.

It is possible that the method comprises one or more or all of the following steps selected from:
i) Moving the transmit coil to a position in which the centres of the transmit coil and receive are vertically aligned.
ii) In a variable frequency system, transmitting power at low power starting at maximum frequency and reducing frequency in a controlled manner.
iii) Measuring at each frequency the coil voltages and currents.
iv) Decreasing the frequency until either the lowest permissible frequency is reached or the efficiency starts to decrease.
v) If the efficiency has decreased before the minimum frequency is reached, increasing the prequency until efficiency has reached a maximum; if all parameters are acceptable then transferring power at a maximum level.
vi) If the system parameters are not acceptable at maximum efficiency or if the minimum frequency was reached, staying at low power the frequency is changed to the maximum frequency.
vii) Displacing the transmit coil by +8 mm in the X direction and repeating the sequence from i) to v).
viii) Repeating step vii) while displacing the transmit coil −8 mm in the X direction, +8 mm in Y direction and −8 mm in the Y direction.
ix) Repeating steps iv) to viii) until acceptable operating conditions are fulfilled or until the X and Y offsets have reached 32 mm.

For fixed frequency systems, only steps vii) to ix) may be required.

While in certain known wireless power transfer systems valid operation parameters can only be obtained by reducing the power rate, the present transfer system can maintain a high power rate and provide safe operating parameters by aligning or misaligning the transmit coil relative to a receive coil.

Apart from the circuit of the controller to position the movable platform, no further active electronics may be needed. Especially in the power circuits no further active electronics may be needed. It is possible that the adjustment of the position of the transmit coil only takes place in the X-Y plane while the vertical position remains unchanged. Thus, a two-dimensional optimization is obtained that renders the driving algorithm faster and more stable.

Evaluation of the operation parameter may lead to repositioning of the transmit coil if required.

The transmit coil and/or the receive coil can be wound utilizing a high frequency litz wire.

The wireless transmit coil and the drive mechanism of the drive unit can be positioned inside a housing which allows a transfer of electromagnetic energy while providing a mechanical protection to the coil into the drive. The power transmission system can have a distance of 80 mm between the transmit coil and the receive coil. The distance can vary between 80 mm and 250 mm. The transferred power can be in the range between 1 kW and 11 kW.

Linear motors can be used in the drive unit to move the movable platform.

The wire of the coil, e.g. a litz wire, can have a thickness of 6 mm. A gap between a ferrite material and the litz wire of the coil can be in the range of 3 mm. The ferromagnetic sheet can have a thickness of 4.1 mm. The gap between the ferromagnetic sheet and the metal plate can be around 10 mm.

It is possible that an impedance circuit is arranged between the inverter and the transmit coil. Further, between a load of the secondary circuit on the receiver side and the receive circuit an impedance circuit can also be electrically connected.

The impedance circuit on the transmit side can comprise a parallel connection of two subcircuits. Each subcircuit comprises eight inductive elements. One subcircuit can comprise or consist of a series connected capacitor or inductor. Another subcircuit can comprise or consist of parallel connected capacitors. The inductance can be in the range of hundreds of pH, e.g. between 100 µH and 1000 µH. The capacitance can be in the range from 5 to 150 nF. The subcircuit can be constructed from a single capacitor or from a multitude of capacitors arranged in a matrix.

Working principles, central aspects and details of preferred embodiments are described in the schematic accompanying figures.

Figure 1:
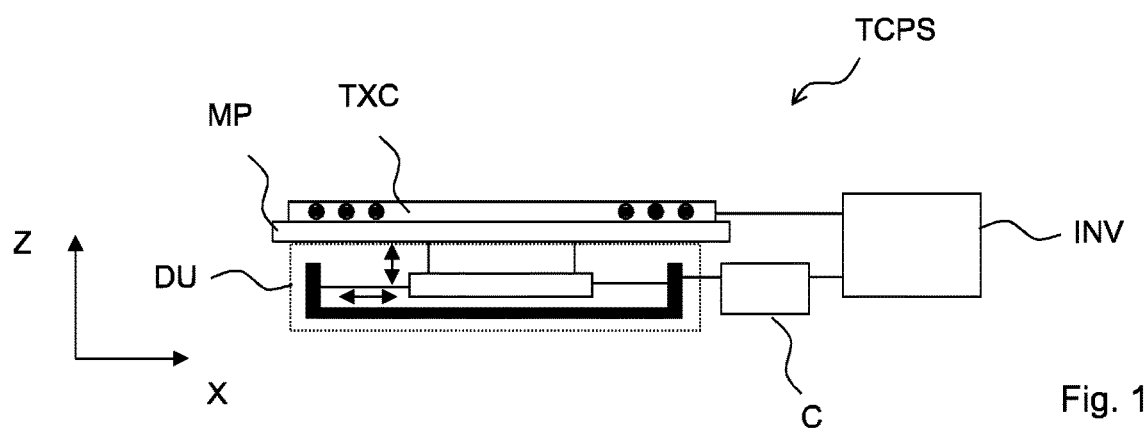
FIG. 1 shows basic construction of a transmit coil positioning system.

FIG. 1 shows basic elements of a dynamic transmit coil positioning system TCPS. The system comprises an inverter INV that provides electric power to the transmit coil TXC. The transmit coil TXC is arranged on a movable platform MP. The movable platform can be moved in one or two horizontal directions and/or the vertical direction utilizing the drive unit DU. Between the drive unit DU and the inverter a controller C is electrically connected.

The controller can obtain information concerning an operation parameter from the inverter INV indicating the quality of the power transmission process and/or compliance with allowed values. To improve the power transfer process, e.g. by complying with compulsory values such as the operation frequency, the controller C determines a preferred position for the transmit coil TXC relative to a receive coil. Thus, by adjusting, aligning, misaligning or detuning the arrangement of the two coils a safe operation can be provided without the need of active circuitry at the receiver side.

Figure 2:
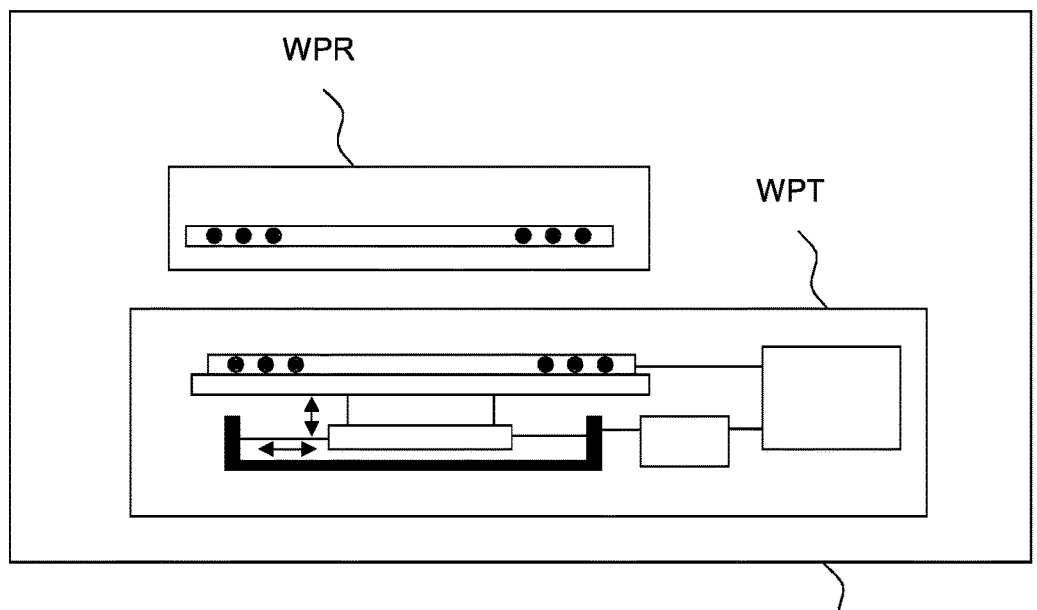
FIG. 2 shows components of a wireless power transfer system.

FIG. 2 shows basic elements of the wireless power transfer system WPTS. The wireless power transfer system WPTS comprises the wireless power transmitter WPT and a wireless power receiver WPR. The wireless power transmitter WPT comprises the elements of the transmit coil positioning system TCPS as shown in FIG. 1 and additional components for the wireless power receiver. The wireless power receiver WPR at least comprises a receive coil.

Figure 3:
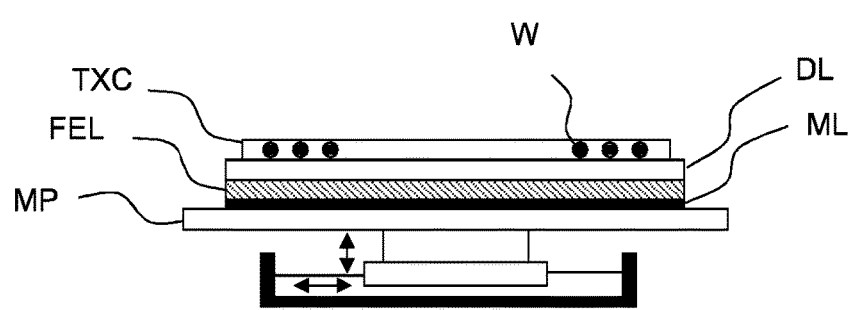
FIG. 3 shows a possible layer construction below the transmit coil.

FIG. 3 shows the possibility of arranging a metal layer ML below the transmit coil TXC. Below the transmit coil TXC and the metal layer ML a ferroelectric layer FEL can be arranged. Between the ferroelectric layer FEL and the transmit coil TXC a dielectric layer DL can be arranged.

The dielectric layer DL works as an insulation layer to electrically insulate the wire of the transmit coil from its environment. The ferroelectric layer helps focusing the magnetic field to provide a maximum field density to a receive coil and to avoid magnetic field dissipating in the vicinity of the system.

Figure 4:
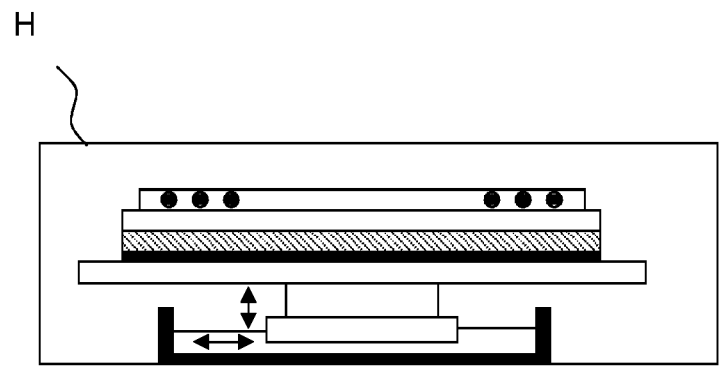
FIG. 4 shows the use of a housing.

FIG. 4 illustrates the use of a housing H to protect the elements of the wireless power transmitter from unwanted environmental influences and to protect elements of the environment from interfering with the mechanical movement of the drive unit.

Figure 5:
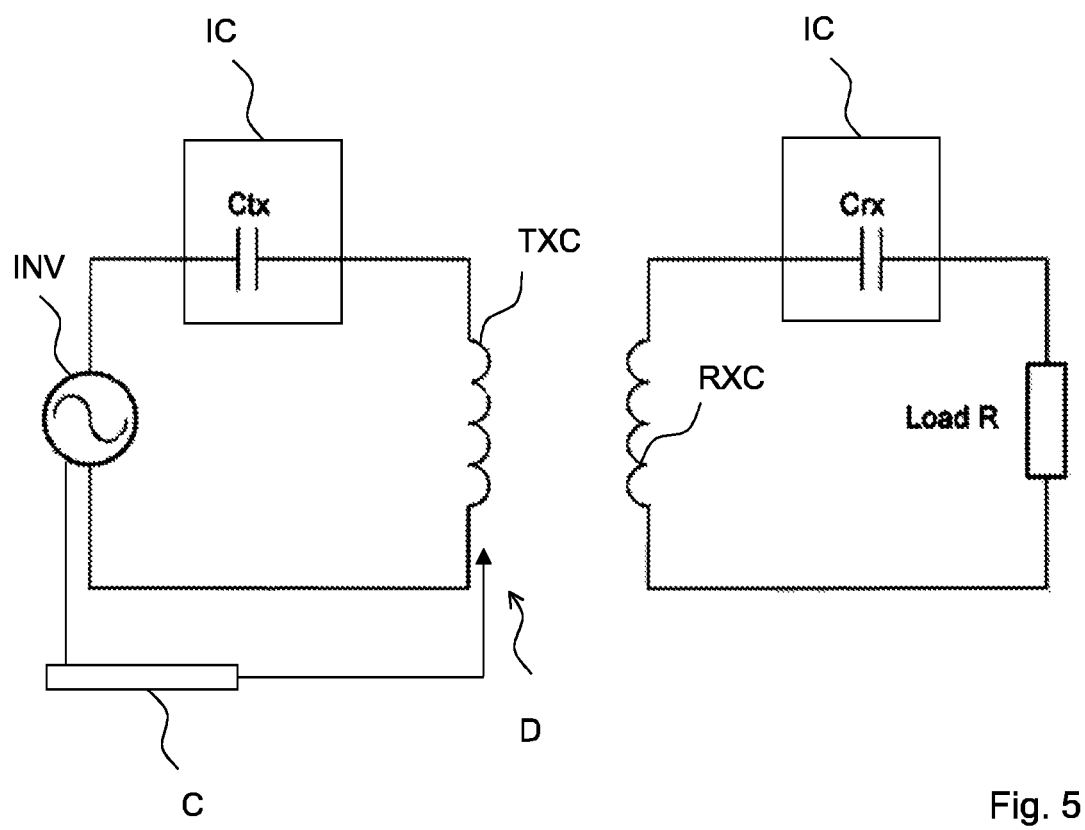
FIG. 5 shows the use of impedance circuits.

FIG. 5 illustrates the use of an impedance circuit IC between the inverter INV and the transmit coil TXC on the transmit side and the use of an impedance circuit IC between the receive coil RXC and a load R on the receiver side. The controller C induces a movement in the direction D of the transmit coil TXC to tune or detune an operation parameter such as the coupling factor to obtain a good overall power transmission process.

The load on the receiver side can be a power consumer and/or an active battery.

Figure 6:
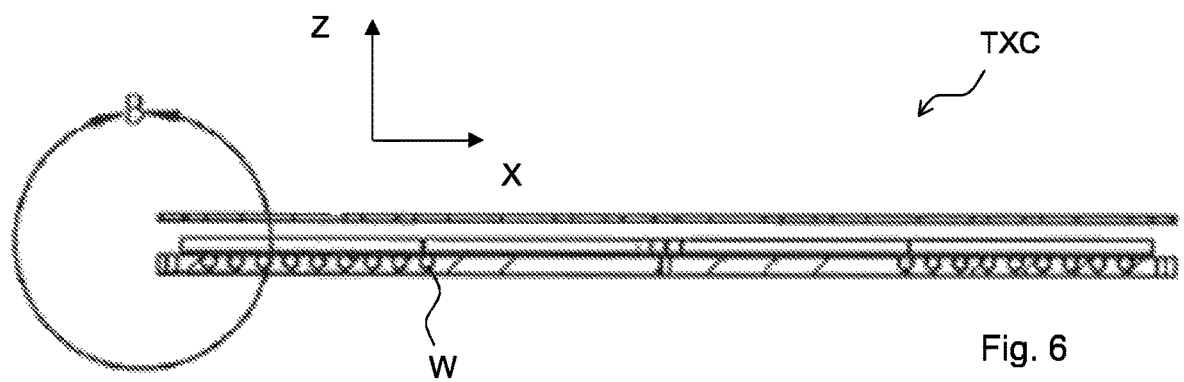
FIGS. 6 and 7 illustrate a possible construction of a transmit coil.

FIG. 6 illustrates a possible construction of the transmit coil TXC comprising a wire W wound in a spiral fashion. FIG. 6 illustrates the cross-section at a position WA as shown in FIG. 7 illustrating a top view onto the transmit coil TXC.

Figure 7:
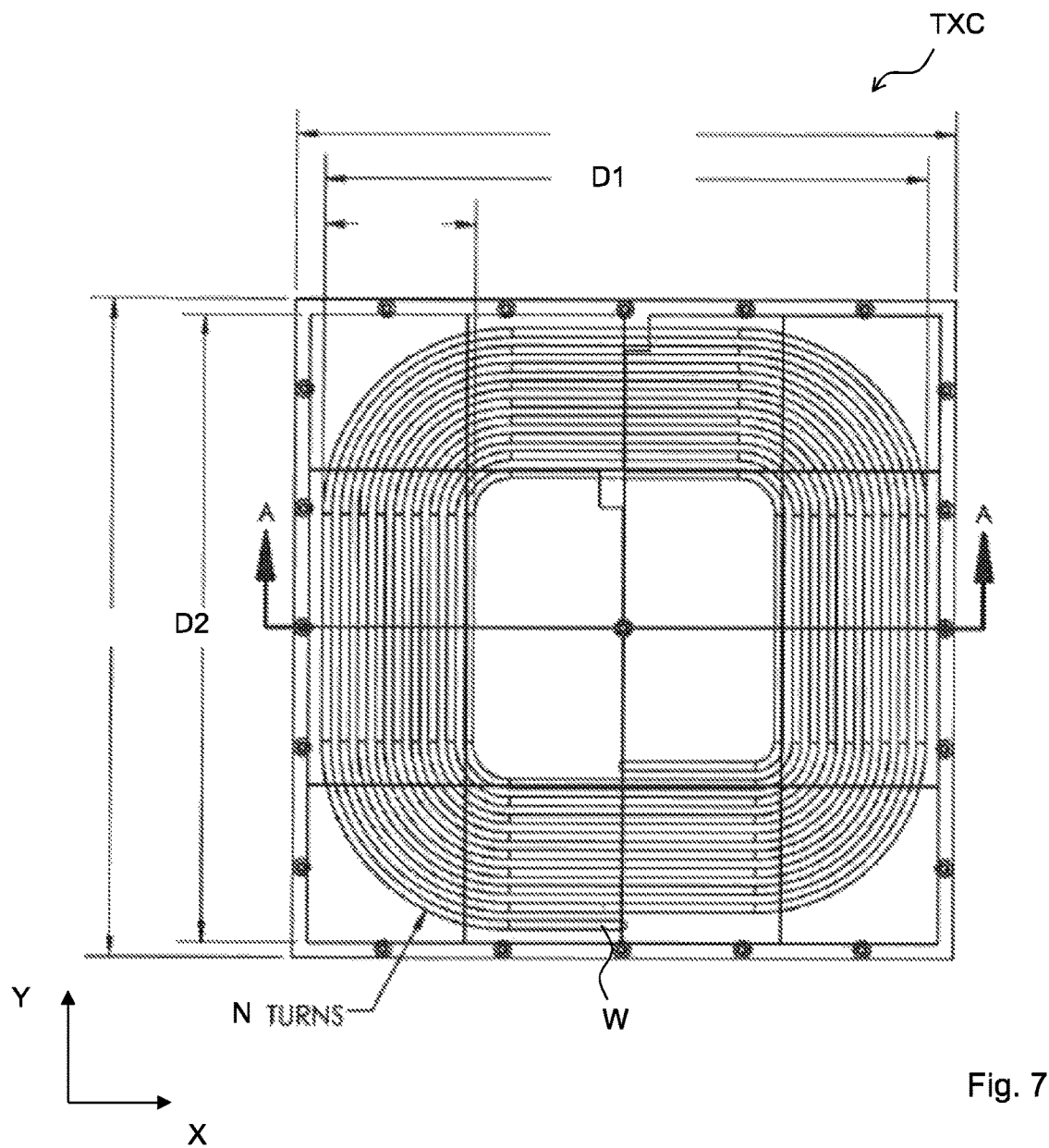

FIG. 7 illustrates the meaning of typical dimensions. D1 is mainly the width of the coil arrangement and can be in the range between 1.0 and 2.0 (e.g. 1.4) times the coil to coil distance. D2 is mainly the length of the coil arrangement and can be in the range between 1.0 and 2.0 (e.g. 1.4) times the coil to coil distance. It is possible that the transmit coil comprises N turns with $1 \leq N \leq 15$. For example, N can be 5.

The transmit coil is essentially a circular coil with a diameter typically equal to at least 1.4 times the vertical distance between the coils. The outer diameter of the transmit coil can therefore be between 120 mm and 350 mm.

The receiver coil shall not have an outer diameter larger than the transmit coil. The ferromagnetic layer and the aluminium layer under the transmit coil shall not be smaller than the transmit coil diameter. Likewise, the ferromagnetic layer and aluminium layer above the receiver coil shall not be smaller than the receiver coil diameter.

Figure 8:
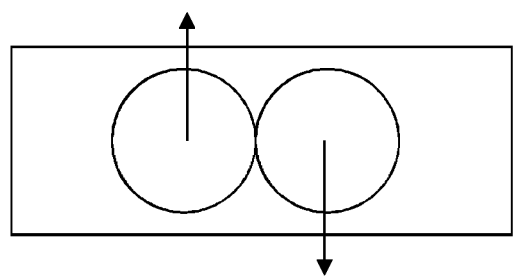
FIG. 8 shows basics of a polarized coil.

FIG. 8 illustrates a non-polarized coil comprising two coil segments arranged next to another. The coil segments are electrically connected such that the direction of a current is opposite in the two different segments resulting in opposite magnetic field directions, resulting in a reduced polarization of the coil.

Figure 9:
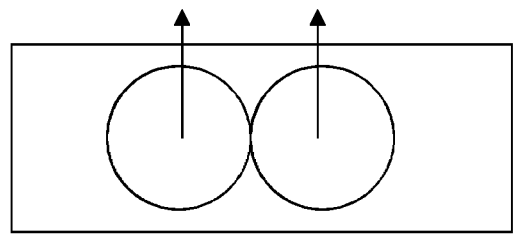
FIG. 9 shows an arrangement of a non-polarized coil.

In contrast, FIG. 9 illustrates a polarized coil where coil elements are electrically connected such that the orientation of the currents in the coil segments has the same directions resulting in the substantial parallel orientation of the resulting magnetic fields such that an overall polarization of the coil is obtained.

The dynamic transmit coil positioning system, the power transfer system and the method for driving the systems are not limited to the shown details and embodiments. The positioning system can further comprise additional circuitry and mechanical actuators for determining operation parameters and for tuning or detuning operation parameters such as the coupling factor.

LIST OF REFERENCE SIGNS

C controller
D1, D2, D3 Distances
DL dielectric layer
DU drive unit
FEL ferroelectric layer
H housing
IC impedance circuit
INV inverter
ML metal layer
MP movable platform
N number of turns
D moving direction
RXC receive coil
TXC transmit coil
TCPS transmit coil positioning system
W wire
WPR wireless power receiver
WPTS wireless power transfer system
WPT wireless power transmitter

The invention claimed is:

1. A method of positioning a transmit coil of a wireless power transfer system, the system comprising the transmit coil and a receive coil,
comprising steps of:
i) moving the transmit coil to a position in which centers of the transmit coil and receive coil are vertically aligned,
ii) in a variable frequency system, starting transmitting power at an initial power lower than a maximum power and at a maximum frequency and reducing frequency in a controlled manner,
iii) measuring at each frequency coil voltages and currents,
iv) decreasing the frequency until either a lowest permissible frequency is reached or an efficiency starts to decrease,
v) if the efficiency has decreased before a minimum frequency is reached, increasing the frequency until the efficiency has reached a maximum; and if all parameters are acceptable then transferring power at a maximum level,
vi) if all parameters are not acceptable at the maximum efficiency or if the minimum frequency was reached, staying at the initial power and the frequency is changed to the maximum frequency,
vii) displacing the transmit coil in X direction and repeating the steps from i) to v),
viii) displacing the transmit coil in Y direction and repeating the steps from i) to v),
ix) displacing the transmit coil in Z direction, and
x) repeating at least steps iv) to viii) until acceptable operating conditions are fulfilled or until X and Y offsets have reached 32 mm, wherein the steps vii) through ix) can be carried out in any order.

2. A dynamic transmit coil positioning system, comprising
a drive unit,
a movable platform connected to the drive unit,
the transmit coil mounted to the movable platform and provided for transferring electromagnetic power to the receive coil,
an inverter electrically connected to the transmit coil,
a controller electrically connected to the inverter and to the drive unit,
where
the controller for positioning the movable platform via the drive unit to adjust an operating parameter of the transmit coil, the controller being configured to perform the steps of the method according to claim 1.

3. The dynamic transmit coil positioning system of claim 2, where the operating parameter of the transmit coil is a magnetic coupling factor between the transmit coil and the receive coil.

4. The dynamic transmit coil positioning system of claim 2, where the drive unit comprises an electrical, pneumatic or hydraulic drive system.

5. The dynamic transmit coil positioning system of claim 2, where the drive unit is provided for obtaining positioning instructions from the controller.

6. The dynamic transmit coil positioning system of claim 2, where the drive unit is provided for acting upon positioning instructions from the controller.

7. The dynamic transmit coil positioning system of claim 2, where the controller is provided for determining a position based on one or more parameters selected from an operating frequency, a current-voltage relationship, a current value, a voltage value.

8. The dynamic transmit coil positioning system of claim 2, further comprising
a metal base below the transmit coil,
a ferromagnetic plate between the transmit coil and the metal base, and
a dielectric layer between the ferromagnetic plate and the transmit coil.

9. The dynamic transmit coil positioning system of claim 2, where the transmit coil is selected from a circular coil, a spiral coil, a multi-coil connection, a polarized coil, and a non-polarized coil.

10. A wireless power transfer system, comprising
a transmit system having the dynamic transmit coil positioning system according to claim 2 and—a receive system having the receive coil provided for receiving power from the transmit coil.

11. The wireless power transfer system of the claim 10, where the transmit coil and the receive coil have the same size.

* * * * *